FIG. I.

May 12, 1953          H. M. ZENOR          2,638,001

UNDERWATER MEASURING DEVICE

Filed Jan. 9, 1947          5 Sheets-Sheet 4

Hughes M. Zenor. INVENTOR.

BY P. J. Whelan

ATTORNEY.

May 12, 1953

H. M. ZENOR 2,638,001

UNDERWATER MEASURING DEVICE

Filed Jan. 9, 1947

Hughes M. Zenor INVENTOR.

BY P. J. Whelan

ATTORNEY.

Patented May 12, 1953

2,638,001

UNITED STATES PATENT OFFICE 2,638,001

UNDERWATER MEASURING DEVICE

Hughes M. Zenor, Houston, Tex., assignor, by mesne assignments, to Standard Oil Development Company, Elizabeth, N. J., a corporation of Delaware Application January 9, 1947, Serial No. 721,032

4 Claims. (Cl. 73—382)

This invention is directed to underwater measuring instruments, such as gravity meters, magnetometers, and the like. For illustrative purposes, the invention will be described with reference to an underwater gravity meter.

In gravitational prospecting it is customary to employ torsion balances or gravity meters. The readings obtained at each station with a torsion balance enable the operator to calculate the gravity gradient and the principal radii of curvature of the gravitational field at the station. Gravity meters, on the other hand, are sensitive, as they are usually constructed to respond only to the vertical component of gravity at the station. When gravity meters are used, it is necessary to take readings at more than one station, because these instruments do not permit of measuring the value of gravity at the station but only the difference between the value at a certain station and another station, usually called the base station. It is possible to derive gradient and curvature values from gravity meter results and, inversely, to compute differences in gravity from torsion balance measurements. However, in practice, these computations are usually not justified, because they are based mathematically on the assumption that the gravitational field is known at all points in the area, and this is obviously never true, because readings are rarely taken at stations even as close together as 100 yards.

The fundamental requirements of gravity meters are sensitivity and reliability of reading. In order that a gravity meter may be useful in prospecting, it is necessary that it be sensitive to one ten-millionth of the value of gravity. Gravity meters for land use have been made sensitive to one one-hundred-millionth of gravity, but this sensitivity is usually too high because the readings are then affected to a high degree by surface effects which have no significance in prospecting. Gravity meters with a sensitivity of one-millionth of gravity are sometimes useful in the investigation of large gravity anomalies, but in gravitational prospecting it is usually necessary to find smaller anomalies on these large anomalies, and it then becomes imperative to employ an instrument with a higher sensitivity, namely, one part in ten million.

In all scientific measurements, reliability of readings is of the utmost importance and gravitational prospecting is no exception. It is usually assumed, however, that a scientific instrument must give the same readings when the conditions exterior to the instrument are the same. On account of the high sensitivity of gravity meters, it is rarely, if ever, possible to attain this condition. Gravity meter readings exhibit what is known as drift. That is, repeated readings at the same station will not be the same. It is for this reason necessary to determine the drift of the instrument, and this is done by selecting five or six stations and reading these in rotation until three or four readings have been obtained at each station. If the instrument is usable, the variations in the readings will show a certain uniformity. It is then possible to predict the reading of the instrument at any given station, where the value of gravity is known, at a future time by reference to the drift curve.

In gravitational prospecting on land, it is customary to mount the instrument in a light truck. At each station a tripod is set on the ground through holes provided in the floor of the automobile, and the gravity meter is placed on this tripod. The instrument is then leveled manually with the aid of spirit levels mounted at right angles on the instrument, and a reading is usually obtained visually. It is usually impossible to take a reading near a railway track while a train is passing or near a highway on account of the vibrations set up in the ground by trains or vehicles. The operator returns to the base station to take a reading at intervals during the day, usually after obtaining readings at a few so-called field stations. The readings at the base station enable him to check the drift curve of the instrument and to detect, on the basis of irregularities in the drift curve, any mechanical difficulties which may develop.

The readings of gravity meters are afflicted with many sources of error. Some of these can be eliminated; others become constant and contribute to the drift of the instrument. A few of these sources of error are the following: Temperature and pressure fluctuations, improper leveling, seismic vibrations, aging, and the oxidation of parts.

Temperature fluctuations result in the lengthening or shortening of instrument parts. It is necessary for this reason to select the materials used in the manufacture of instruments and to arrange the component parts of the instrument in such a manner that temperature fluctuations will not result in changes in length of those parts which contribute to the reading. Thus, it is customary to utilize the principle of the gridiron pendulum in which changes in length in a certain direction are cancelled by changes in length of the same magnitude in the opposite direction in order that a certain selected point may remain stationary at all temperatures. This principle is usually employed on the support of the gravity meter spring.

Temperature changes bring about changes in the elasticity of materials, and since all gravity meters employ a spring of some kind, changes in elasticity must be very carefully obliterated. This is usually done by the proper selection of the spring materials.

Temperature changes also set up air currents within the instrument, and it is necessary to provide baffles and appropriate shields to reduce the air-currents and to prevent their affecting the vibrating system of the instrument directly.

As in the case of analytical balances, pressure fluctuations inside the instrument affect the reading of the instrument. It is necessary, therefore, either to house the instrument in a hermetically sealed case or to determine the effect of pressure variations on the readings in order that the gravity observations may be corrected, by means of the calibration data, with barometric observations obtained concurrently.

It is obvious that an instrument designed to measure the vertical component of gravity must be read in the vertical position. Any deviation of the instrument from the vertical affects the reading. If the angle between the vertical and the instrument were known, it would be possible to correct the observations. It is usually easier, however, to set the instrument in the vertical position by providing sufficiently sensitive spirit levels mounted at right angles.

For the reason that all gravity meters incorporate a mass suspended by a spring from some fixed support, thus constituting a vibrating system, it is evident that the gravity sensitive system will respond to vibrations imposed on the gravity meter case. The effect of these forced vibrations on the system is usually reduced by properly damping the gravity sensitive system. However, it is impossible to make any mechanical system immune to forced vibrations, and for this reason gravity meter operators cease observations whenever the instrument is subjected to severe vibrations as, for example, from trains, road vehicles, or earthquakes.

Age affects the elastic properties of materials as well as the linear dimensions. Thus, a rod made to a certain length at a given temperature will not have exactly that length at the same temperature several years later. In the case of most materials, the temperature effects on the elastic properties are much more violent immediately after the material has been worked than at a later time. Thus, it is known that materials can be annealed by varying the temperature for a suitable length of time. A spring supporting its proper load will thus become stable in two or three years due to the daily temperature changes. The same degree of stability may be brought about in the course of an hour by treating it with an electric current in a hydrogen atmosphere to prevent oxidation.

The formation of oxides deleteriously affects gravity meter readings, and to an especially high degree if the gravity meter spring is affected. It is necessary to prevent oxidation, because its effect cannot be predetermined. This is usually accomplished by previously oxidizing the gravity meter parts, by preventing the adulteration of the gravity meter atmosphere with oxygen or other gases by means of hermetic seals, and by providing the interior of the case with suitable and proper chemicals, such as pyrogallic acid, phosphorous pentoxide, activated charcoal, etc.

Underwater gravity meters are afflicted with the same sources of error, although some of them are greatly magnified, as the land meters, and they must satisfy the same requirements respecting sensitivity and reliability of reading. Several difficulties arise incidental to the use of such meters. For example, it is obvious that an underwater meter cannot be read visually; the meter lies on the bottom of the sea while the operator must remain in the boat unless a diving bell is employed. The gravity-sensitive instrument cannot be easily clamped or unclamped. The meter cannot be leveled visually. Moreover, it is obvious that the checking of base stations is much more difficult and time-consuming than in the case of land instruments.

Finally, wave action constitutes a source of forced vibrations which threaten to vitiate the gravity readings of an underwater instrument unless steps are taken either to eliminate them or to reduce their intensity to a sufficiently low level that their resultant effect on the gravity readings is negligible. Sea bottoms vary from very hard, such as, for example, oyster beds, to several feet of mud with apparently no bottom at all. The operator of an underwater gravity meter cannot choose stations with solid underground like the operator of a land instrument does. Also, the use of specialized instruments, say for hard or for muddy bottoms, is not feasible. Rather, an instrument of universal applicability is desirable if not imperative for economical and reliable underwater gravity prospecting.

Among the objects of the present invention are the following:

(1) To provide an instrument of sufficient sensitivity and reliability of reading equipped for remote reading.

(2) To equip the instrument with devices for automatic leveling.

(3) To nullify the vibration effects due to wave-motion and other sources.

Other and important objects of my invention will appear from the following description and accompanying drawing; in which Fig. 1 is a side elevation of the exterior of the meter;

Figure 1:
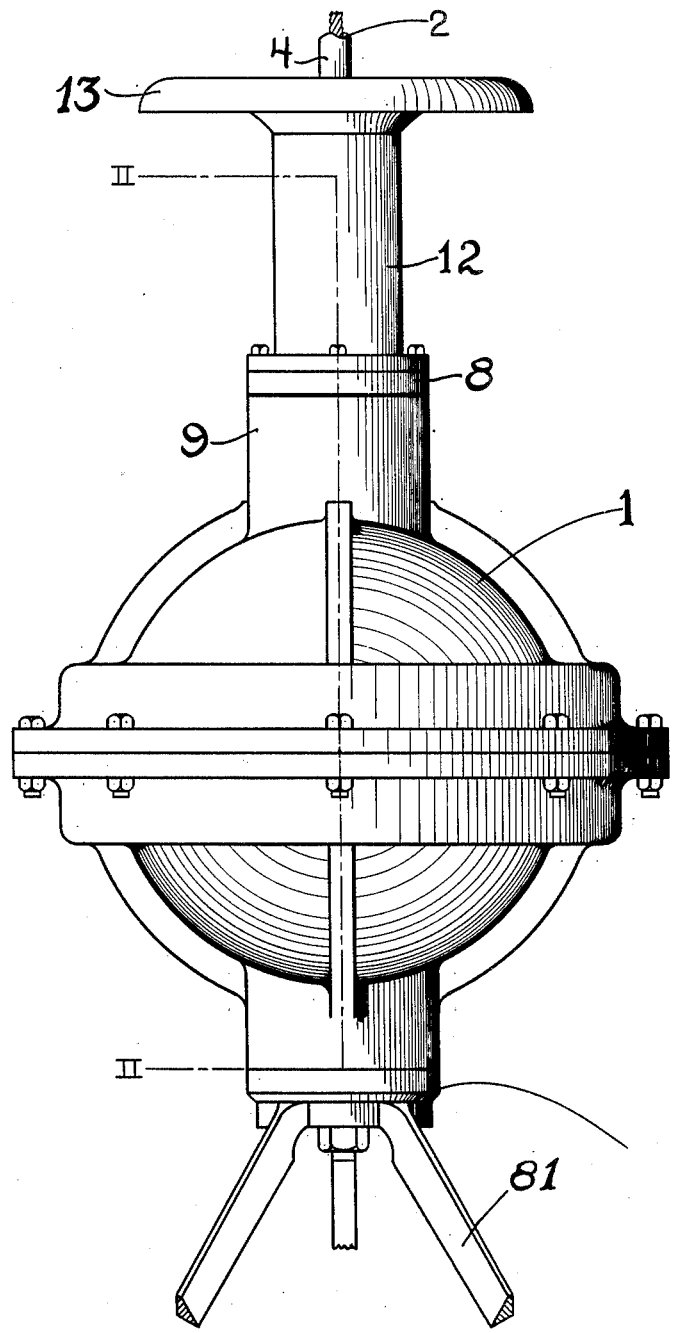
Figure 2:
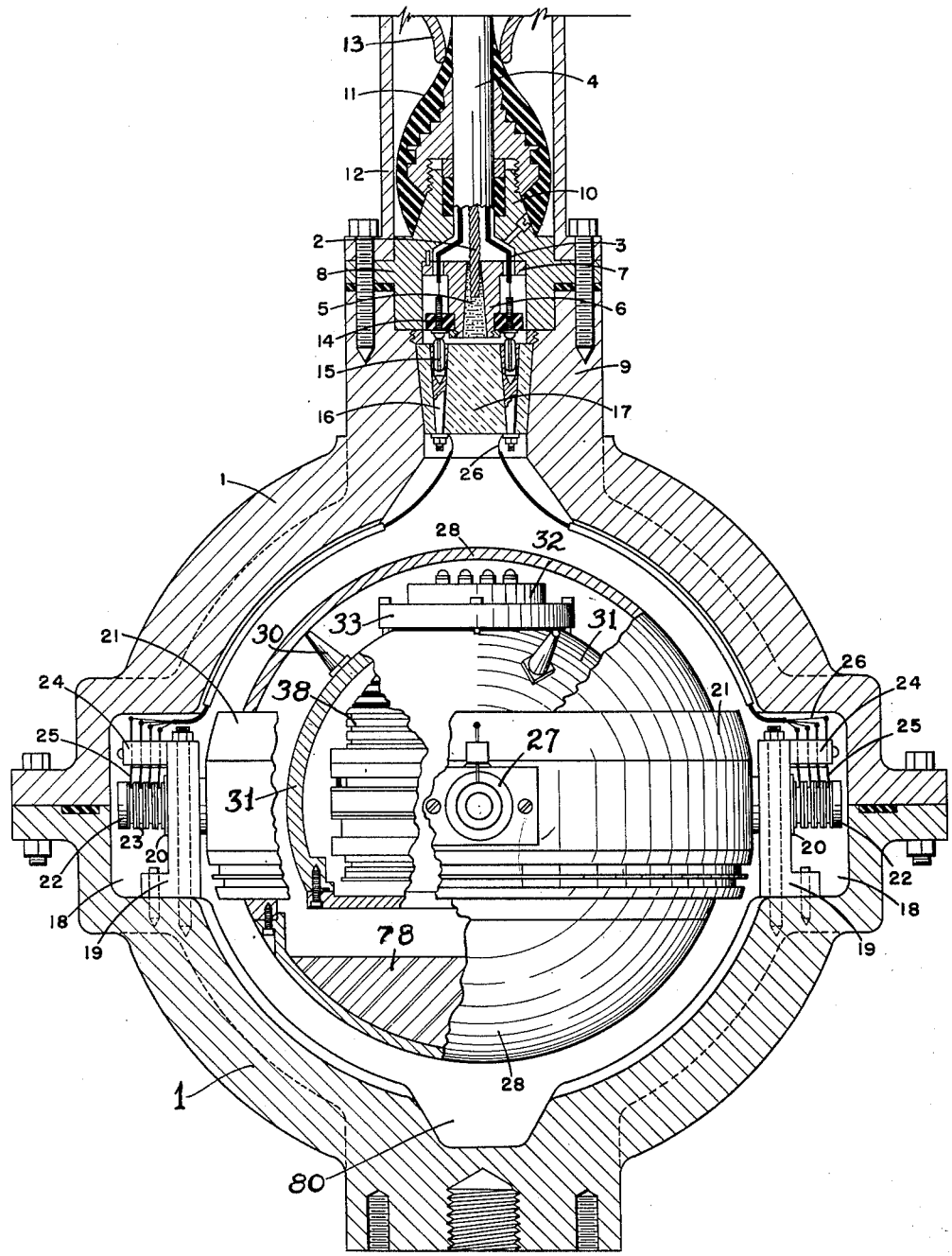
Fig. 2 is a vertical section along the line II—II of Fig. 1.
Figure 3:
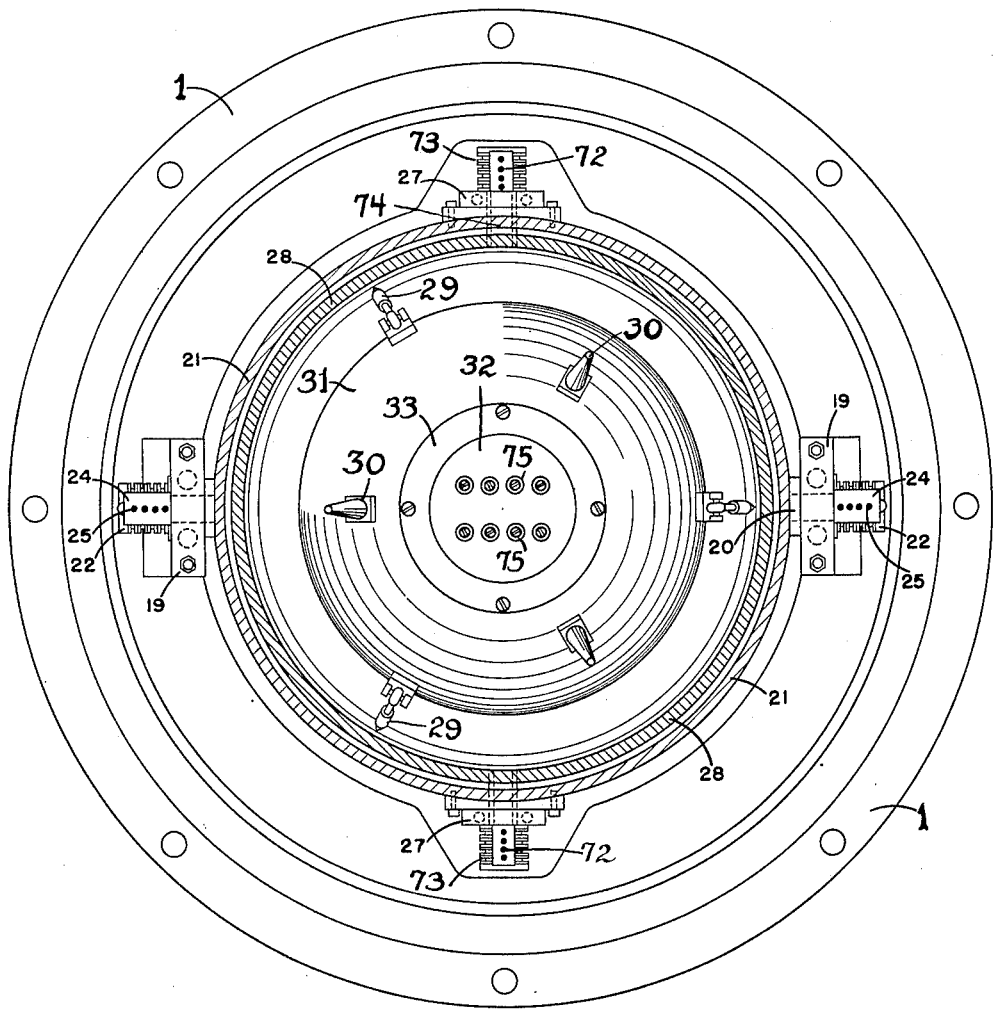
Fig. 3 is a plan view of the instrument with the upper half removed to show sphere adjacent the innermost chamber.

Referring to the drawing in detail, numeral 1 designates a casing or container of sufficient mechanical strength to withstand pressures encountered in use. The casing is suspended from a suitable cable which may be wound on a reel in any conventional marine vessel. This cable, as illustrated, comprises an inner core 2 which is the load carrying element of the cable. Surrounding this core are the requisite number of insulated conductors 3 which in turn are encased in a sheath 4 of rubber or other protective material.

The end of core 2 is embedded in a lead plug 5 which is locked in a steel collar 6 having on one end a flange 7 adapted to seat on an internal shoulder in a head 8 which has a recess to receive the collar and a peripheral flange adapted to be bolted to the upper end of a neck 9 forming an inlet to casing 1. Opposite its recessed end, the head 8 has a nipple 10 through which the cable passes through a suitable packing gland. Secured to the nipple is a protective layer 11 of rubber or other suitable material. Also bolted to the neck 9 and surrounding the cable and protecting layer is a sleeve 12 having a flared outer end 13 for engagement by handling means.

Carried by the lower end of collar 6 is an insulating ring 14 carrying a plurality of electrical jacks 15 which are arranged for insertion in socket pins 16 carried by a plug of insulating material 17 seated in neck 9. The conductors inside casing 1 are connected to the lower ends of socket pins 16 and the conductors in the cable are connected to the upper ends of the jacks, the flange 7 being suitably perforated to pass said conductors. The plug 17 and the socket pins 16 are tapered downwardly so that exterior pressure has the effect of tightening the seal in neck 9.

Casing 1 is provided with diametrically opposed recesses 18 in a plane passing through the center of the sphere at right angles to the axis of neck 9. Secured in each recess is a block 19 in each of which is journaled a hollow stub shaft 20. The inner end of each shaft is secured to a gimbal ring 21 which by virtue of this connection is adapted to rotate on said shafts.

The outer end of each stub shaft carries a slip ring supporting sleeve 22 made of insulating material and carrying on its outer surface spaced slip rings 23. Mounted on each block 19 is a bracket of insulating material 24 carrying a plurality of spaced spring conductor fingers 25, each adapted to slide on one of said slip rings 23 as ring 21 rotates. Each of the spring fingers is connected to a conductor 26, the other end of which is connected to one of the socket pins 16.

Journaled in gimbal ring 21 in bearings 27 spaced 90° from blocks 19 is a sphere 28. There are two of these journals 27 arranged opposite each other on gimbal ring 21. These journals are similar in construction to journals 19 and have slip rings protruding from their outer surfaces. To provide for the rotation of the gimbal ring with these protruding parts, casing 1 is provided with an internal peripheral groove 80, permitting a full rotation of the gimbal ring about journals 19. Cast in the bottom of sphere 28 is lead weight 78 to lower the center of gravity of sphere 28.

Positioned inside sphere 28 by means of adjustable supports 29 and fixed supports 30 is sphere 31. Atop sphere 31 is a cap 32 which is fixed to sphere 31 by means of a plurality of screws through a ring 33. Gaskets 34 and 35 are to prevent oil leakage from the interior of sphere 31. The space between sphere 31 and chamber 38 suspended therein is filled with oil to damp the swing of said chamber.

Attached to under side of cap 32 by means of screws 36 is a universal joint assembly 37 which suspends the chamber 38 inside of sphere 31.

Positioned inside chamber 38, which is made in two halves to simplify assembly, is a case 39 which is fixed to chamber 38 by means of blocks 40 which are attached to the four corners of case 39 and adjusting screws 41 which are threaded into the under side of the top of chamber 38. Case 39 is positioned away from the top of chamber 38 by means of a ball 42 which centers in an appropriate socket in the center of the top of case 39 and the center of the under side of the top of chamber 38. By means of the four adjusting screws 41 the case 39 can be tilted on the ball 42 to alter the relation of case 39 to chamber 38.

Figure 4:
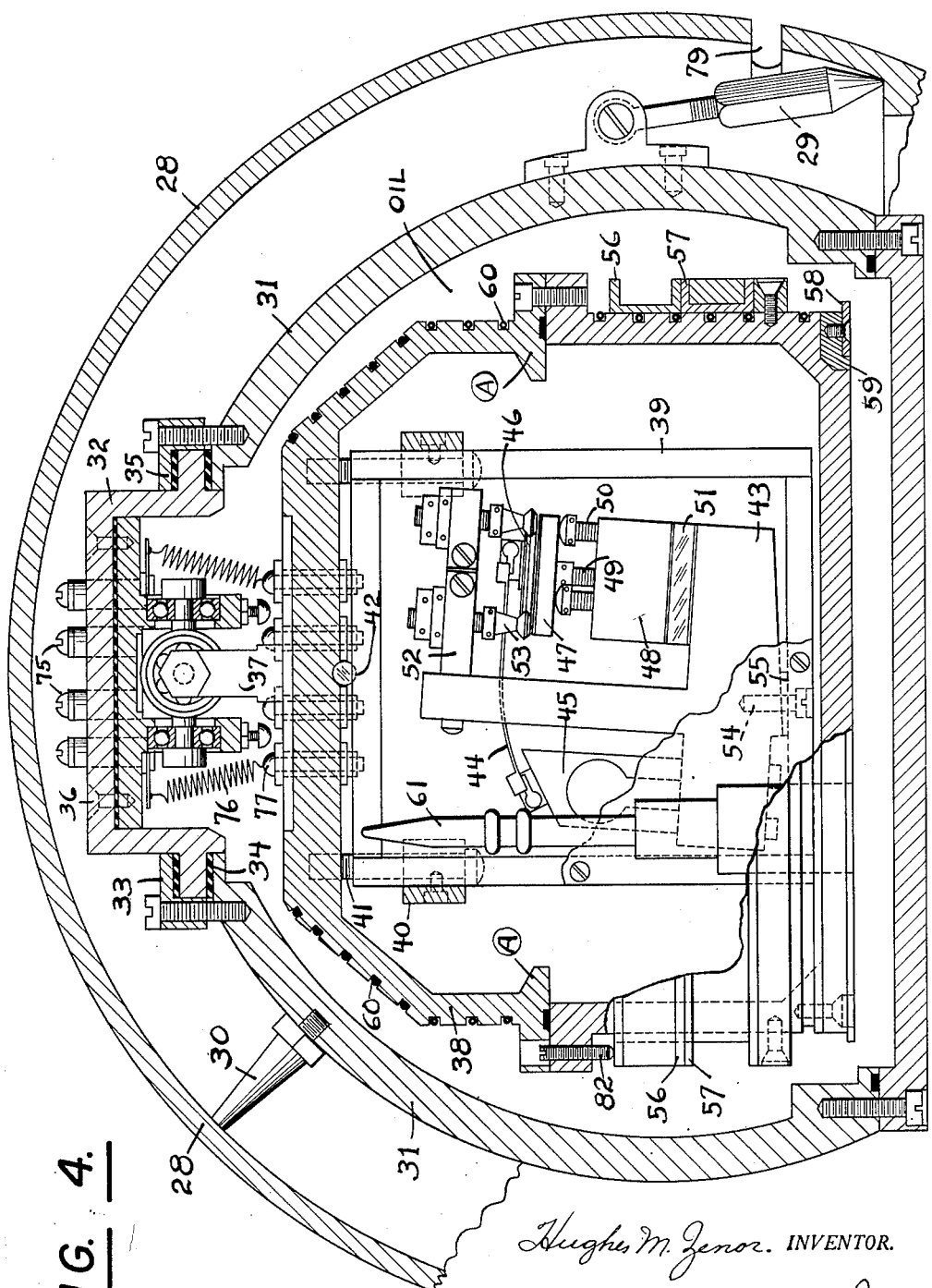
Fig. 4 is a vertical section of the innermost chamber.
Figure 5:
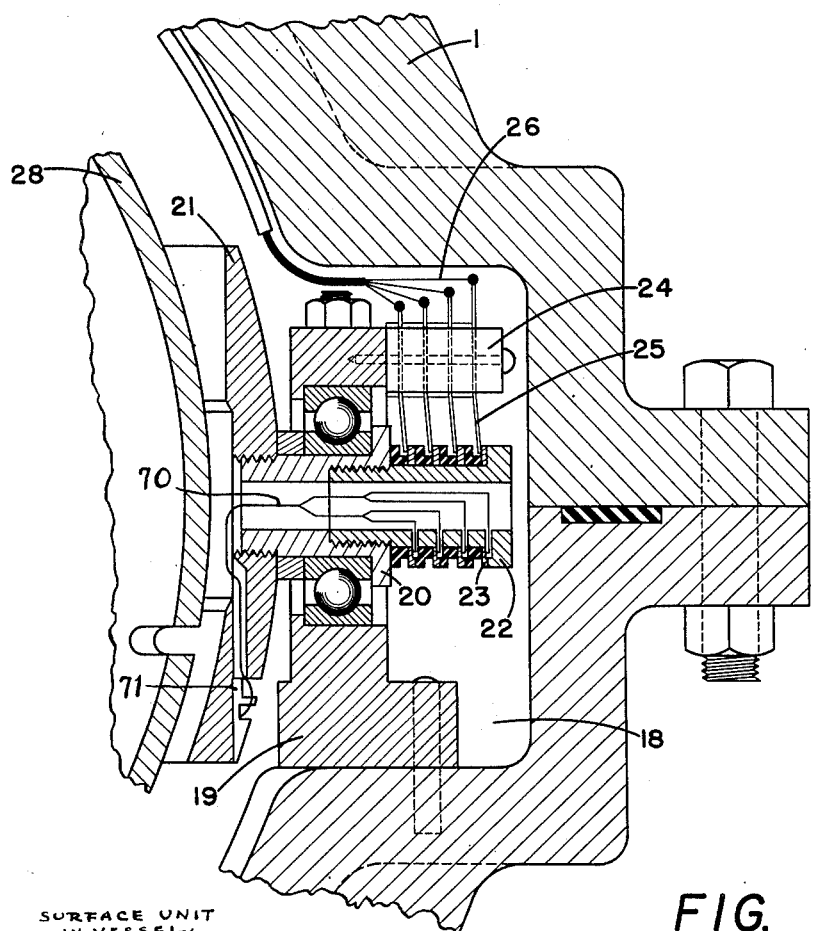
Fig 5 is a detail of a gimbal journal.

Also surrounding case 39 and inside of chamber 38 are the parts and mounts of oscillator 69 (Fig. 6) which have been eliminated from Fig. 4 for clarity of the drawing.

Casing 39 contains the gravity sensitive unit 43 which preferably consists of a leaf spring 44 clamped on one end to a block 45 and carrying on its other end a metal plate 46 which constitutes, with stationary plate 47, an electrical condenser. Plate 47 is fixed to a metallic block 48 by means of an adjstable center screw 49. Also positioned around screw 49 are a plurality 3 of screws 50 threaded into block 48 whose heads contact the underside of plate 47 enabling said plate to be leveled in relation to plate 46. Between block 48 and the frame of sensitive unit 43 is positioned an insulating block 51 preferably of glass material. Carried by frame arm 52 are a plurality 4 of eccentric adjusting screws 53, which constitute limit stops for plate 46.

Sensitive unit 43 is fixed to the bottom of case 39 by means of a plurality of screws 54. Positioned between sensitive unit 43 and case 39 is a metallic wedge 55. The angle of this wedge is varied to adjust the level of sensitive unit to case 39 to suit variations in the leaf spring 44.

Surrounding chamber 38 are two rings 56 and 57. Each ring is loaded on one side with weights (in this case lead) so that by rotating rings 56 and 57 in relation to each other, balance of chamber 38 inside sphere 31 can be realized. Rotating rings 56 and 57 are locked in position by a plurality of set screws 82. Also carried on lower edge of chamber 38 is a metallic ring 58 insulated from chamber 38 by means of ring 59. The purpose of this ring is to give an indication whenever chamber 38 swings too far and contacts sphere 31.

Also on the outside surface of chamber 32 is cut a groove in which is carried a heating coil 60 energized by a battery 62 at the surface (see Fig. 6) which heats chamber 38 and, by radiation, the interior of case 39. Temperature regulation is accomplished by thermo-regulator 61 which is positioned on base of chamber 38 between chamber 38 and casing 39.

Figure 6:
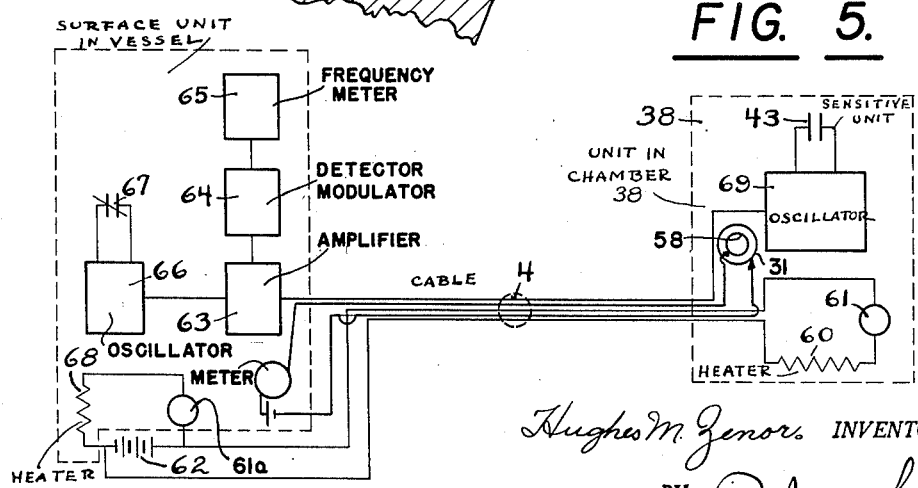
Fig. 6 is a diagram of the overall electric measuring circuit.

Fig. 6 illustrates a block schematic wiring diagram of the electrical circuit within the meter case 1 and also instruments located on the surface boat and connected to the meter on the bottom by cable 4.

Elements of the surface circuit are as follows: Amplifier 63, detector modulator 64, frequency meter 65, oscillator 66, calibrating condenser 67, heater 68, to heat oscillator 66; thermo-regulator 61a, to regulate heater 68 and battery 62. This circuit is connected to the circuit on the bottom by cable 4. The circuit on the bottom consists of an oscillator 69, the sensitive unit 43, a heater coil 60 and thermo-regulator 61.

*Description of wiring from cable 4 into chamber 38*

A plurality of leads 26 from cable leads 3 through jacks 15 connect to springs 25 fixed in blocks 24. Spring fingers 25 contact a plurality of slip rings 23 on slip ring supporter 22. From the inside edge of rings 23, leads 70 thread through the sleeve 20 and a hole in gimbal ring 21, to grooves 71 in gimbal ring 21. Leads 70 are then laid in grooves 71 and 90° around gimbal ring 21 to a plurality of spring fingers 72 and thence to slip ring supporter 73. From slip ring supporter 73 a plurality of leads pass through sleeves 74 into sphere 28, thence to a plurality of insulated binding posts 75 which extend through cap 32 into the interior of sphere 31. To the lower ends of binding posts 75 are attached a plurality of helical spring conductors 76 which in turn fasten to insulated conductor pins 77 located in the top of chamber 38 and passing through to the interior of chamber 38 where the leads connect the circuit of the oscillator 69, sensitive unit 43, heater 60, thermoregulator 61 and tilt indicator 58.

Description of leveling of meter

Leveling of plate 47 in sensitive unit 43 is done by adjustment of screws 49, 50 in block 48. Leveling of sensitive unit 43 to case 39 is accomplished by choosing of wedge 55 and tightening of screws 54. Leveling of case 39 to chamber 38 is done by adjusting screws 41. All the above steps are fairly rough levels and are checked by spirit levels which are removed after these steps are completed. This gets sensitive unit 43, case 39, and chamber 38 approximately hanging center in sphere 31. Plates 46 and 47 may consequently be slightly off at this point. Then rotatable weight rings 56 and 57 are adjusted until, by determining the capacity between plates 46 and 47, the desired balance is reached between the sensitive unit 43 and sphere 31. Then, with sphere 31 mounted in sphere 28 by supports 29 and 30 and the bottom of sphere 28, including lead weight 78, in place, relation of sphere 31 to sphere 28 is adjusted by changing adjustable supports 29 through wrench slots 79 until reading of the capacity between plates 46 and 47 shows that the whole system is level to sphere 28.

The instrument may be calibrated by observing the beat frequencies at two land stations at which the value of gravity is known; or it may be calibrated by placing it into the elevator of a building and observing the beat frequencies at various elevations at which the values of gravity are known from observations with other gravity meters.

In United States Patent No. 2,322,681 granted June 22, 1943, and entitled "Condenser Gravity Meter" I have disclosed a gravity sensitive unit which has proved very satisfactory in practical measurements under water. The gravity meter condenser, disclosed in this application, can be incorporated in the gravity sensitive unit 43 of Fig. 4.

A heavy metal tripod 81 is attached to the bottom of outer case 1. The legs of this tripod assure good contact with the bottom. Where the bottom is muddy, the weight of the instrument forces the tripod downward into the mud. Experience has shown that the instrument is steady when it finally, after several minutes, comes to rest.

The heavy metal tripod 81 rigidly attached to the bottom of outer case 1, serves in effect as the mass of a seismic sensitive device whenever the instrument is lowered to a muddy bottom. In all cases, whatever the nature of the bottom may be, the lead weight 78 also serves as the mass of a seismic sensitive apparatus. Furthermore, chamber 38 is suspended from sphere 31 by the universal joint suspension 37 so that chamber 38 serves in effect as the mass of a seismic sensitive arrangement. The three effective masses: the metal tripod 81, the lead weight 78 and the chamber 38, therefore, constitute an arrangement which is equivalent to the vibrating systems sometimes employed in so-called compound seismographs of three masses. This vibrating system operates as follows: Whenever the instrument is lying on a muddy bottom seismic vibrations shake the instrument with less amplitude than the amplitude of the supporting bottom. The amplitude of the lead weight 78 is much smaller than the amplitude of the outer case, including tripod 81, the decrease in amplitude depending upon the ratio of the masses and upon the frequencies of the forcing vibration and of the vibrating system of which lead weight 78 is a part. Finally, the inner chamber 38 can vibrate only with energy received from lead weight 78. It is obvious that the chamber 38 will vibrate with smaller amplitude than the lead weight 78, the decrease in amplitude again depending upon the constants of the two vibrating systems.

When the instrument is placed on a hard bottom, such as an oyster bed, very intimate contact is made between the tripod 81 and the bottom. The outer case 1 and tripod 81 become essentially a part of the earth or of the sea bottom in this case, and seismic vibrations shake the outer case 1 with about the amplitude of the sea bottom. In this case, then, the lead weight 78 and chamber 38 constitute a compound vibrational system of two masses. The reduction in the amplitude of vibration of chamber 38 is, in this case, less than in the case above discussed in which a compound vibrational of three masses was involved. However, experience has shown that fortunately a smaller reduction of amplitude seems to be required on hard bottom. The explanation appears to be that more of the vibrational energy is used to maintain high frequencies on hard bottom; whereas, the low frequencies are stronger on muddy bottoms. The natural frequencies of the various vibrating systems involved in the instrument, for example, of the system consisting of sphere 28 and its contents and oscillating with the universal joint suspension 37 as center, are low compared with the seismic frequencies involved when the instrument rests on a hard bottom, and for this reason alone the device is insensitive to high frequencies.

It will be apparent that many changes may be made in the arrangement heretofore described without departing from the scope of the present invention. Universal joints of different specific design may be employed. The gravity sensitive elements may be of a purely mechanical nature. The various containers may be of different shapes and sizes. Alternative leveling and damping devices may be employed. All such changes are contemplated within the scope of the present invention.

Having fully described and illustrated the present invention, what I desire to claim as new and useful and to secure by Letters Patent is:

1. A force measuring device for use under water comprising an outer water-tight casing, means for suspending said casing from the surface, an inner casing spaced from said outer casing and mounted for rotation in any direction with respect thereto, means for keeping a selected axis of said inner casing vertical, a third casing within said inner casing, means for holding said third casing in spaced relation to said inner casing, a container within said third casing, a universal connection between said container and said third casing providing free relative movement between them and elements responsive to the force to be measured mounted within said container.

2. A force measuring instrument for use under water comprising an outer water-tight casing constituting a first mass, means for suspending said casing from the surface, an inner casing spaced from said outer casing and mounted for rotation in any direction relative thereto, a second mass secured to said inner casing tending to hold a selected axis of said inner casing vertical, a third casing within said inner casing, means for holding said third casing in spaced relation to said inner casing and a mass universally suspended within said third casing and carrying the elements sensitive to the force to be measured.

3. A force measuring instrument for use under water comprising an outer water-tight casing, means for suspending said casing from the surface, a pair of oppositely disposed journals in said casing, a ring mounted in said journals for rotation about an axis passing through said journals, a pair of oppositely disposed journals in said ring on a line at right angles to a line passing through the journals on said casing, an inner casing mounted for rotation on said ring journals about an axis passing through said journals, means for keeping a selected axis of said inner casing vertical, a third casing mounted within said inner casing, means for holding said third casing in spaced relation to said inner casing, a container suspended universally within said third casing and an element responsive to the force to be measured within said container.

4. A force measuring instrument comprising an outer water-tight casing, a cable for suspending said casing from the surface, a pair of oppositely disposed journals in said casing, shafts in said journals having their inner ends fixed to a ring having a diameter coincident with a line passing through said journals, slip rings and slip ring supporting sleeves carried by the other end of either shaft, a pair of oppositely disposed journals in said ring spaced 90° from the aforesaid journals, shafts in said journals having their inner ends secured to a sphere having a diameter coincident with a line passing through said ring journals, a slip ring and slip ring supporting sleeves carried by the other end of either of said last-mentioned shafts, conductors carried by said cable connected in sequence to the slip rings on the first-mentioned shafts and the slip rings on the second-mentioned shafts, a casing mounted within said sphere, means for holding said casing in spaced relation to said sphere, a container freely suspended by a universal connection in said casing, elements in said container for responding to the force to be measured, electrical means for creating an electrical signal which is a function of said response, means connecting said electrical means to said slip rings and means at the surface for indicating said electrical signal.

HUGHES M. ZENOR.

References Cited in the file of this patent

UNITED STATES PATENTS

| Number | Name | Date |
| --- | --- | --- |
| 2,149,953 | Birnbaum | Mar. 7, 1939 |
| 2,384,739 | Hasbrook | Sept. 11, 1945 |